United States Patent
Amaya et al.

(10) Patent No.: US 11,077,613 B2
(45) Date of Patent: Aug. 3, 2021

(54) THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

(71) Applicant: TECHNOLOGY RESEARCH ASSOCIATION FOR FUTURE ADDITIVE MANUFACTURING, Tokyo (JP)

(72) Inventors: Koichi Amaya, Fukui (JP); Toshihiko Kato, Fukui (JP); Hideto Matsubara, Fukui (JP); Mitsuyoshi Yoshida, Fukui (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 158 days.

(21) Appl. No.: 15/513,434

(22) PCT Filed: Sep. 2, 2016

(86) PCT No.: PCT/JP2016/075862
§ 371 (c)(1),
(2) Date: Mar. 22, 2017

(87) PCT Pub. No.: WO2018/042631
PCT Pub. Date: Mar. 8, 2018

(65) Prior Publication Data
US 2018/0229431 A1     Aug. 16, 2018

(51) Int. Cl.
*B29C 67/00* (2017.01)
*B29C 64/176* (2017.01)
(Continued)

(52) U.S. Cl.
CPC ............ *B29C 64/176* (2017.08); *B22F 10/20* (2021.01); *B29C 64/153* (2017.08);
(Continued)

(58) Field of Classification Search
CPC ......... B33Y 10/00; B33Y 30/00; B33Y 50/00; B33Y 50/02; B29C 64/171; B29C 64/176;
(Continued)

(56) References Cited

U.S. PATENT DOCUMENTS 7,665,979 B2 *  2/2010  Heugel ................. B29C 64/153
                                                    425/174.4
8,187,521 B2     5/2012  Larsson et al.
(Continued)

FOREIGN PATENT DOCUMENTS

JP    2001-150557 A    6/2001
JP    2003-245981 A    9/2003
(Continued)

OTHER PUBLICATIONS

International Search Report (ISR) and Written Opinion (WO) dated Nov. 22, 2016 for International Application No. PCT/JP2016/075862.
(Continued)

*Primary Examiner* — Ryan M Ochylski
(74) *Attorney, Agent, or Firm* — Ladas & Parry LLP

(57) ABSTRACT

The stop time of a whole apparatus caused by planning of shaping, maintenance, replacement of a material, or the like is shortened. A three-dimensional laminating and shaping apparatus includes a plurality of shaping chambers, at least one material supplier that supplies a material of a three-dimensional laminated and shaped object onto a shaping table in each of the shaping chambers, at least one light beam irradiator that irradiates the material with a light beam, and
(Continued)

a controller that controls the material supplier and the light beam irradiator. If the material supplier supplies the material onto one of the shaping tables, the controller controls the light beam irradiator to perform irradiation of the light beam onto the other one of the shaping tables.

7 Claims, 16 Drawing Sheets

(51) Int. Cl.
  *B33Y 30/00* (2015.01)
  *B33Y 10/00* (2015.01)
  *B33Y 50/02* (2015.01)
  *B29C 64/393* (2017.01)
  *B29C 64/264* (2017.01)
  *B22F 10/20* (2021.01)
  *B29C 64/153* (2017.01)
  *B29C 64/268* (2017.01)
  *B22F 10/30* (2021.01)

(52) U.S. Cl.
  CPC .......... *B29C 64/264* (2017.08); *B29C 64/268* (2017.08); *B29C 64/393* (2017.08); *B29C 67/00* (2013.01); *B33Y 10/00* (2014.12); *B33Y 30/00* (2014.12); *B33Y 50/02* (2014.12); *B22F 10/30* (2021.01)

(58) Field of Classification Search
  CPC ... B29C 64/182; B29C 64/153; B29C 64/393; B29C 64/268; B22F 10/30
  See application file for complete search history.

(56) References Cited

U.S. PATENT DOCUMENTS

| | | |
|---|---|---|
| 2003/0205851 A1 | 11/2003 | Laschutza et al. |
| 2005/0116391 A1* | 6/2005 | Lindemann ........... B29C 64/357 |
| | | 264/497 |
| 2005/0263932 A1 | 12/2005 | Heugel |
| 2012/0211926 A1 | 8/2012 | Larsson et al. |
| 2013/0108726 A1* | 5/2013 | Uckelmann ............ B33Y 50/02 |
| | | 425/174.4 |
| 2013/0193620 A1* | 8/2013 | Mironets ............... B29C 64/153 |
| | | 264/401 |
| 2016/0200084 A1 | 7/2016 | Hays et al. |
| 2017/0050379 A1 | 2/2017 | Houben et al. |

FOREIGN PATENT DOCUMENTS

| | | |
|---|---|---|
| JP | 2009-1900 A | 1/2009 |
| JP | 5108884 B2 | 10/2012 |
| WO | 2008/146698 A1 | 12/2008 |
| WO | 2015/163765 A1 | 10/2015 |

OTHER PUBLICATIONS

J-PlatPat English abstract of JP 2001-150557 A.
J-PlatPat English abstract of JP 2003-245981 A.
J-PlatPat English abstract of JP 2009-1900 A.
Supplementary European Search Report (SESR) dated Aug. 6, 2018 in connection with European Patent Application No. 16 84 5353.8.

* cited by examiner

FIG. 4

| SHAPING CHAMBER ID | SCHEDULE | | | | |
|---|---|---|---|---|---|
| | T1 | T2 | T3 | T4 | ... |
| P001 | ○ | — | ○ | — | |
| P002 | — | ○ | — | ○ | |

411 — SHAPING CHAMBER ID
412 — SCHEDULE
401

| SHAPING CHAMBER ID | SCHEDULE | | | | |
| --- | --- | --- | --- | --- | --- |
|  | T1 | T2 | T3 | T4 | ... |
| P001 | O | — | — | O |  |
| P002 | — | O | — | — |  |
| P003 | — | — | O | — |  |

F I G. 10A

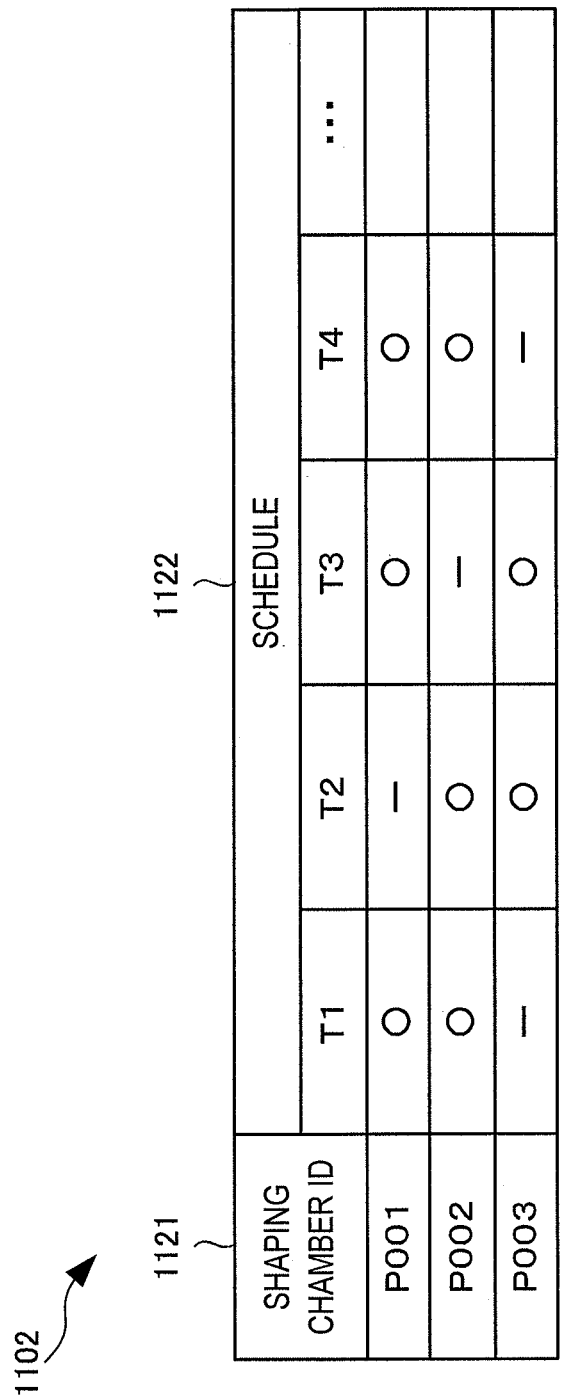
F I G. 10B

THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

RELATED APPLICATION

This application is an application under 35 U.S.C. 371 of International Application No. PCT/JP2016/075862 filed on Sep. 2, 2016, the entire contents of which are incorporated herein by reference.

TECHNICAL FIELD

The present invention relates to a three-dimensional laminating and shaping apparatus, a control method of the three-dimensional laminating and shaping apparatus, and a control program of the three-dimensional laminating and shaping apparatus.

BACKGROUND ART

In the above technical field, patent literature 1 discloses a three-dimensional laminating and shaping apparatus for, for example, making planning for shaping, performing maintenance, or replacing a material by stopping a whole apparatus.

CITATION LIST

Patent Literature

Patent literature 1: Japanese Patent No. 5108884

SUMMARY OF THE INVENTION

Technical Problem

In the three-dimensional laminating and shaping apparatus described in the above literature, however, it is impossible to shorten the stop time of the whole apparatus caused by the planning for shaping, maintenance, replacement of a material, or the like.

The present invention enables to provide a technique of solving the above-described problem.

Solution to Problem

One aspect of the present invention provides a three-dimensional laminating and shaping apparatus comprising:
a plurality of shaping chambers;
at least one material supplier that supplies a material of a three-dimensional laminated and shaped object onto a shaping table in each of the shaping chambers;
at least one light beam irradiator that irradiates the material with a light beam; and
a controller that controls the material supplier and the light beam irradiator,
wherein if the material supplier supplies the material onto one of the shaping tables, the controller controls the light beam irradiator to perform irradiation of the light beam onto the other one of the shaping tables.
Another aspect of the present invention provides a control method of a three-dimensional laminating and shaping apparatus including
a plurality of shaping chambers,
at least one material supplier that supplies a material of a three-dimensional laminated and shaped object onto a shaping table in each of the shaping chambers, and
at least one light beam irradiator that irradiates the material with a light beam,
the method comprising:
causing a first material supplier to supply a first material onto a shaping table in a first shaping chamber, and causing the light beam irradiator to irradiate a second material in a second shaping chamber with the light beam;
causing a second material supplier to supply a second material onto a shaping table in the second shaping chamber, and causing the light beam irradiator to irradiate the first material in the first shaping chamber with the light beam; and
repeating the causing the first material supplier and the causing the second material supplier while moving the light beam irradiator.

Still other aspect of the present invention provides a control program of a three-dimensional laminating and shaping apparatus including
a plurality of shaping chambers,
at least one material supplier that supplies a material of a three-dimensional laminated and shaped object onto a shaping table in each of the shaping chambers, and
at least one light beam irradiator that irradiates the material with a light beam,
the program for causing a computer to execute a method, comprising:
causing a first material supplier to supply a first material onto a shaping table in a first shaping chamber, and causing the light beam irradiator to irradiate a second material in a second shaping chamber with the light beam;
causing a second material supplier to supply a second material onto a shaping table in the second shaping chamber, and causing the light beam irradiator to irradiate the first material in the first shaping chamber with the light beam; and
repeating the causing the first material supplier and the causing the second material supplier while moving the light beam irradiator.

Advantageous Effects of Invention

According to the present invention, it is possible to shorten the stop time of a whole apparatus caused by maintenance, replacement of a material, or the like.

BRIEF DESCRIPTION OF DRAWINGS

FIG. 4 is a table for explaining an example of a shaping schedule table included in the three-dimensional laminating and shaping apparatus according to the first example embodiment of the present invention;

FIG. 10A is a table for explaining an example of a shaping schedule table included in a three-dimensional laminating and shaping apparatus according to the fourth example embodiment of the present invention;

FIG. 10B is a table for explaining another example of the shaping schedule table included in the three-dimensional laminating and shaping apparatus according to the fourth example embodiment of the present invention.

DESCRIPTION EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A three-dimensional laminating and shaping apparatus 100 according to the first example embodiment of the present invention will be described with reference to FIGS. 1A to 5. The three-dimensional laminating and shaping apparatus 100 is a powder bed type three-dimensional laminating and shaping apparatus for shaping a three-dimensional laminated and shaped object by spreading a material of the three-dimensional laminated and shaped object on a shaping table, and irradiating the spread material with a light beam.

Figure 1A:
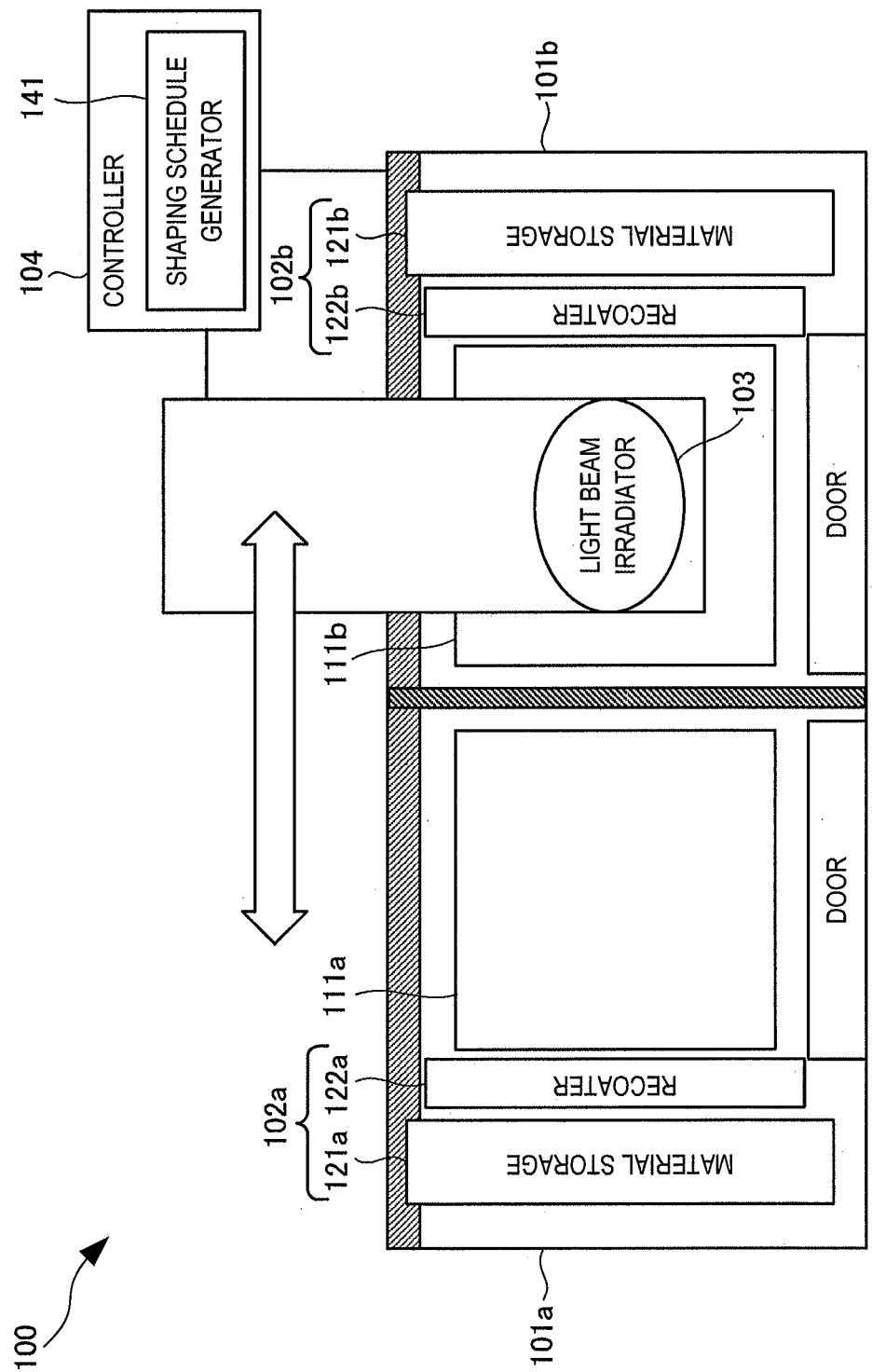
FIG. 1A is a plan view for schematically explaining the arrangement and operation of a three-dimensional laminating and shaping apparatus according to the first example embodiment of the present invention.
Figure 1B:
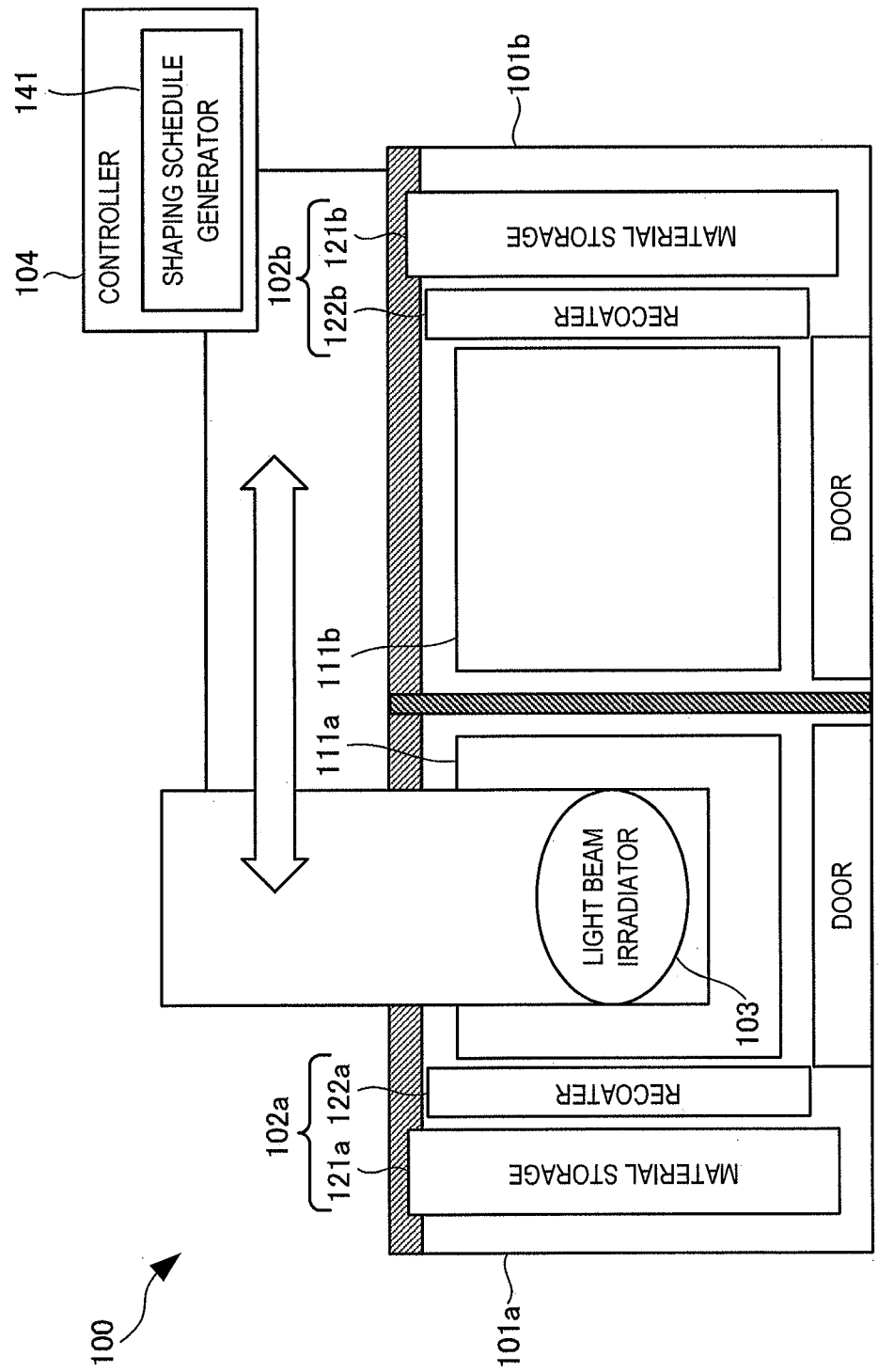
FIG. 1B is a plan view for schematically explaining the arrangement and operation of the three-dimensional laminating and shaping apparatus according to the first example embodiment of the present invention.
Figure 2A:
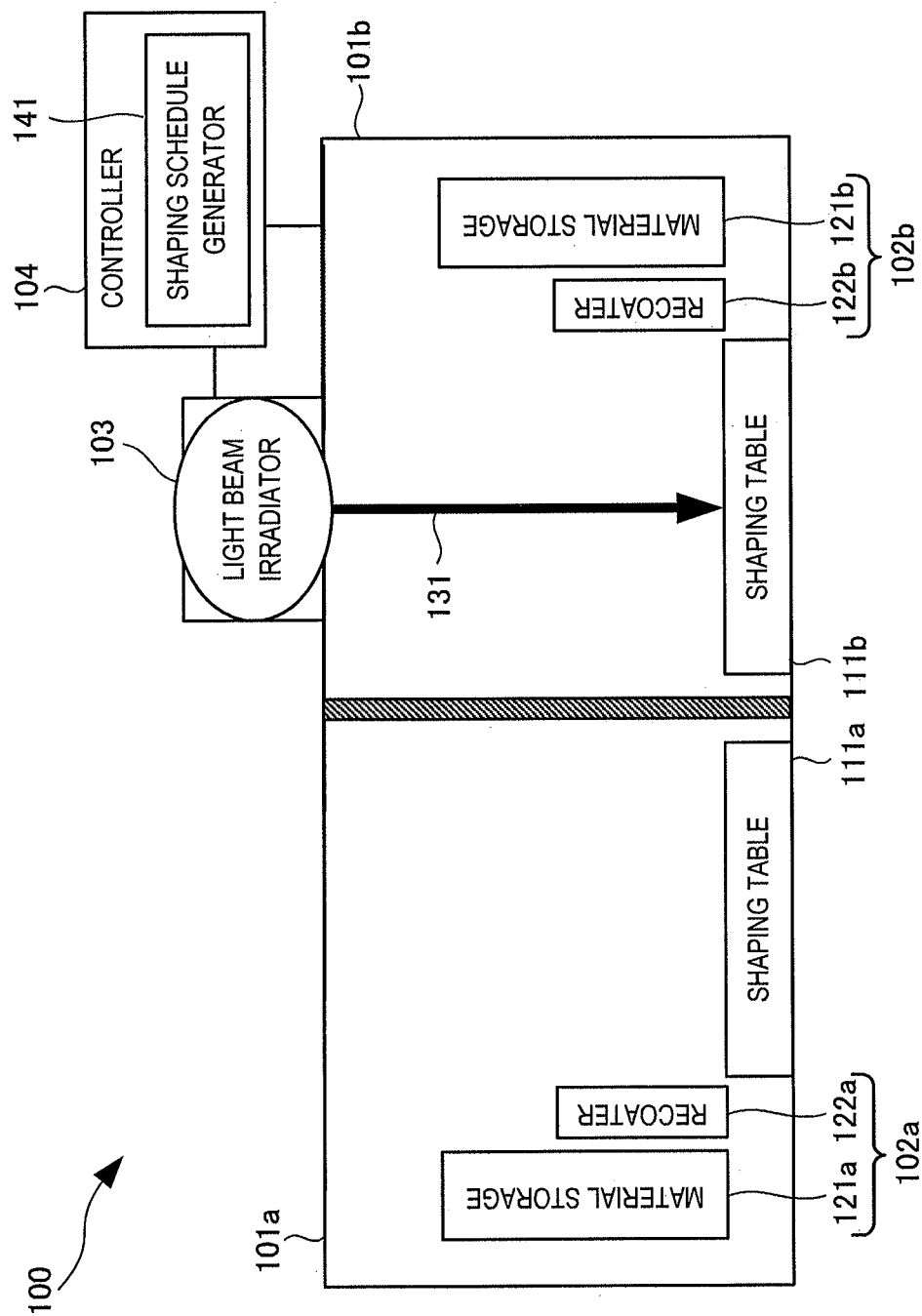
FIG. 2A is a front view for schematically explaining the arrangement and operation of the three-dimensional laminating and shaping apparatus according to the first example embodiment of the present invention.
Figure 2B:
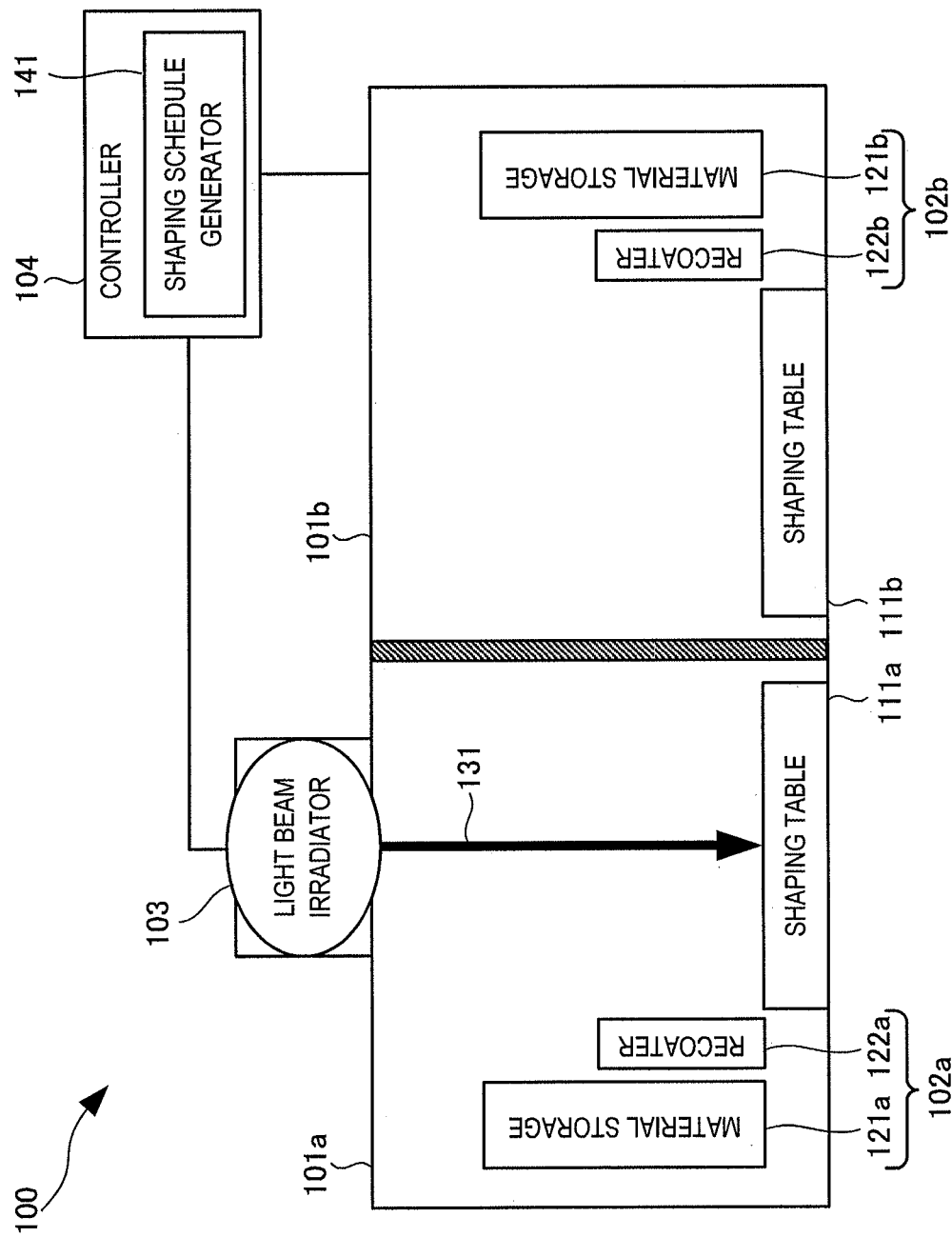
FIG. 2B is a front view for schematically explaining the arrangement and operation of the three-dimensional laminating and shaping apparatus according to the first example embodiment of the present invention.

FIGS. 1A and 1B are plan views for schematically explaining the arrangement and operation of the three-dimensional laminating and shaping apparatus according to this example embodiment. FIGS. 2A and 2B are front views for schematically explaining the arrangement and operation of the three-dimensional laminating and shaping apparatus according to this example embodiment.

<Arrangement of Three-Dimensional Laminating and Shaping Apparatus>

The three-dimensional laminating and shaping apparatus 100 includes shaping chambers 101a and 101b, material suppliers 102a and 102b, a light beam irradiator 103, and a controller 104. The shaping chambers 101a and 101b further include shaping tables 111a and 111b, respectively. The shaping chambers 101a and 101b are arranged side by side. A three-dimensional laminated and shaped object is shaped on each of the shaping tables 111a and 111b. The three-dimensional laminated and shaped object is shaped by laminating the material by repeating a process of spreading the material for one layer on the shaping table 111a or 111b, irradiating the spread material with a light beam, melting the material, and solidifying the material.

Note that the number of shaping chambers is not limited to two and may be three or more. For example, the number of shaping chambers may be determined by increasing or decreasing it in accordance with the size of a three-dimensional laminated and shaped object to be shaped. If the number of shaping chambers is three or more, various arrangements such as a linear arrangement (parallel arrangement), L-shaped arrangement, and C-shaped arrangement can be adopted as the arrangement of the shaping chambers.

The material suppliers 102a and 102b include material storages 121a and 121b and recoaters 122a and 122b, respectively. Each of the material storages 121a and 121b stores the material of a three-dimensional laminated and shaped object, and supplies it to a corresponding one of the recoaters 122a and 122b. Each of the recoaters 122a and 122b spreads the material supplied from a corresponding one of the material storages 121a and 121b on a corresponding one of the shaping tables 111a and 111b. Each of the recoaters 122a and 122b spreads the material for one layer. Note that each of the recoaters 122a and 122b may spread the material for a few layers on a corresponding one of the shaping tables 111a and 111b. The material is, for example, a metal powder or resin powder, but is not limited to them. The same material or different materials may be supplied to the shaping chambers 101a and 101b.

The light beam irradiator 103 irradiates the material spread on the shaping table 111a or 111b with a light beam 131, thereby melting the material, and solidifying it. The light beam 131 with which the material is irradiated is, for example, a laser beam, but is not limited to this. In the three-dimensional laminating and shaping apparatus 100, the shaping chambers 101a and 101b share the light beam irradiator 103. By allowing the shared use of an expensive member like the light beam irradiator 103 between the plurality of shaping chambers 101a and 101b, the manufacturing cost of the three-dimensional laminating and shaping apparatus can be reduced. Note that for example, if a fume collector is attached to the light beam irradiator 103, the shared use of the fume collector is also allowed.

The controller 104 includes a shaping schedule generator 141. The controller 104 controls the material suppliers 102a and 102b and the recoaters 122a and 122b to adjust the supply amounts of the materials, supply timings, and the like. Furthermore, the controller 104 controls the light beam irradiator 103 to adjust the output (energy), irradiation time, and the like of the light beam 131 with which the material spread on each of the shaping tables 111a and 111b is to be irradiated.

The shaping schedule generator 141 generates a shaping schedule for shaping a three-dimensional laminated and shaped object to be shaped in each of the shaping chambers 101a and 101b. The shaping schedule is, for example, data indicating that a specific three-dimensional laminated and shaped object is shaped in a specific shaping chamber at a specific timing, or the operation schedule of the whole three-dimensional laminating and shaping apparatus 100 including timings of planning, maintenance, refilling of the material, and the like. The controller 104 controls the material suppliers 102a and 102b and the light beam irradiator 103 to shape the three-dimensional laminated and shaped objects in accordance with the generated shaping schedule. Note that the shaping schedule generator 141 may be an external component of the controller 104.

<Operation of Three-Dimensional Laminating and Shaping Apparatus>

The three-dimensional laminating and shaping apparatus 100 operates, as shown in FIGS. 1A to 2B. As shown in FIG. 1A (FIG. 2A), in one shaping chamber 101a, planning for shaping the three-dimensional laminated and shaped object, extraction of the completed three-dimensional laminated and shaped object, or the like is performed. In the planning, for example, the material storage 121a is refilled with the material, the interior of the shaping chamber 101a is cleaned, and maintenance is performed. The present invention, however, is not limited to them.

While planning and the like are made in the shaping chamber 101a, the three-dimensional laminated and shaped object is shaped in the other shaping chamber 101b by causing the light beam irradiator 103 to irradiate the material with the light beam 131 to melt the material and solidify it. Upon completion of shaping of the three-dimensional laminated and shaped object, the light beam irradiator 103 moves to the side of the shaping chamber 101a.

As shown in FIG. 1B (FIG. 2B), in the shaping chamber 101a where the planning and the like are made, the light beam irradiator 103 irradiates the material with the light beam 131. Then, the three-dimensional laminated and shaped object is shaped when the material irradiated with the light beam 131 is melted and solidified. At the same time, the completed three-dimensional laminated and shaped object is extracted from the shaping chamber 101b where shaping of the three-dimensional laminated and shaped object has been performed, and planning, cleaning, maintenance, and the like are performed in preparation for next shaping. The three-dimensional laminating and shaping apparatus 100 repeats the above operation.

Note that a case in which the two shaping chambers are included has been explained above. However, even if three or more shaping chambers are included, the three-dimensional laminating and shaping apparatus 100 performs the same operation. In addition, a case in which the one light beam irradiator 103 is included has been explained above. However, even if two or more light beam irradiators 103 are included, the three-dimensional laminating and shaping apparatus 100 performs the same operation. When the number of shaping chambers is represented by N, the number (M) of light beam irradiators 103 desirably satisfies M<N. In this way, by setting the number (M) of light beam irradiators 103 to be smaller than the number (N) of shaping chambers, there exist the shaping chambers 101a and 101b where no irradiation of the light beam 131 is performed. It is thus possible to make planning in the shaping chambers 101a and 101b where no irradiation of the light beam 131 is performed.

Figure 3:
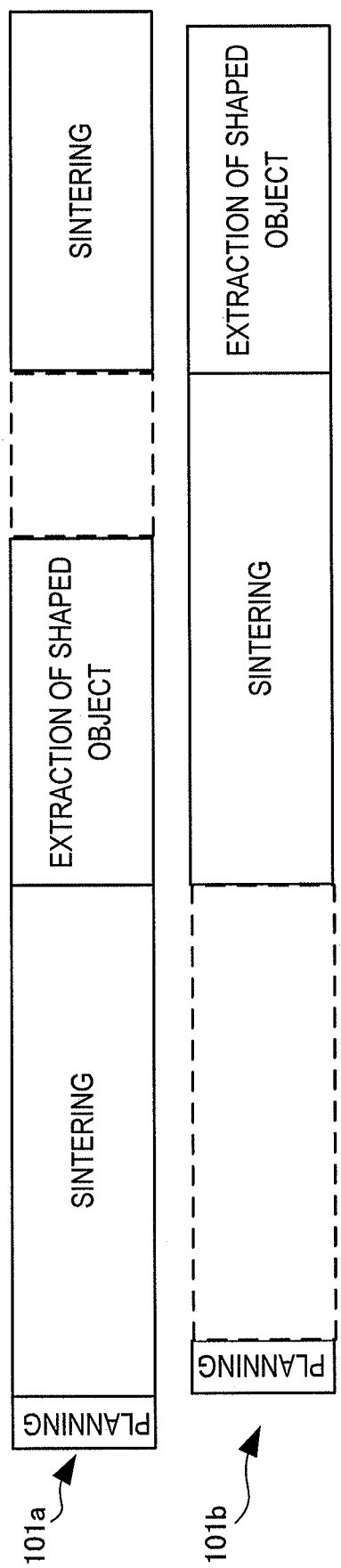
FIG. 3 is a view for explaining a down time in the three-dimensional laminating and shaping apparatus according to the first example embodiment of the present invention.

FIG. 3 is a view for explaining a down time in the three-dimensional laminating and shaping apparatus 100 according to this example embodiment. The down time indicates a time other than a time during which the material is irradiated with the light beam and sintered. FIG. 3 shows operation contents in the shaping chambers 101a and 101b when two three-dimensional laminated and shaped objects are shaped using the two shaping chambers 101a and 101b (two shaping tables 111a and 111b).

First, in the shaping chamber 101a, planning and the like are made, and the material is irradiated with the light beam 131 and sintered (melted and solidified). Then, while the material is sintered in the shaping chamber 101a, planning and the like are made in the shaping chamber 101b. When sintering of the material is finished and the three-dimensional laminated and shaped object is completed in the shaping chamber 101a, sintering of the material starts and shaping of a three-dimensional laminated and shaped object are performed in the shaping chamber 101b. While sintering of the material is performed in the shaping chamber 101b, the completed three-dimensional laminated and shaped object is extracted from the shaping chamber 101a, and planning and the like are made in preparation for next shaping.

Since the three-dimensional laminating and shaping apparatus 100 operates, as described above, the light beam irradiator 103 is always in an active state (a state in which sintering is continued), thereby shortening the down time during which the light beam irradiator 103 is in an inactive state, that is, a state in which the whole three-dimensional laminating and shaping apparatus 100 stops.

FIG. 4 is a table for explaining an example of a shaping schedule table 401 included in the three-dimensional laminating and shaping apparatus 100 according to this example embodiment. The shaping schedule table 401 is a table which stores a shaping schedule, and stores a schedule 412 in association with shaping chamber IDs (Identifiers) 411. "○" indicates a light beam irradiation process (sintering process) of melting and solidifying the material by performing irradiation of the light beam 131, and "-" indicates a process of performing no irradiation of the light beam 131 (a process of, for example, making planning and extracting the three-dimensional laminated and shaped object).

As shown in FIG. 4, the schedule indicates that during a time interval T1, irradiation of the light beam 131 is performed in a shaping chamber having a shaping chamber ID "P001" and planning and the like are made in a shaping chamber having a shaping chamber ID "P002". The schedule indicates that during a time interval T2, irradiation of the light beam 131 is performed in the shaping chamber having the shaping chamber ID "P002" and planning and the like are made in the shaping chamber having the shaping chamber ID "P001". As described above, as for the two shaping chambers 101a and 101b, the schedule indicates that the light beam irradiation processes are alternately repeated.

Figure 5:
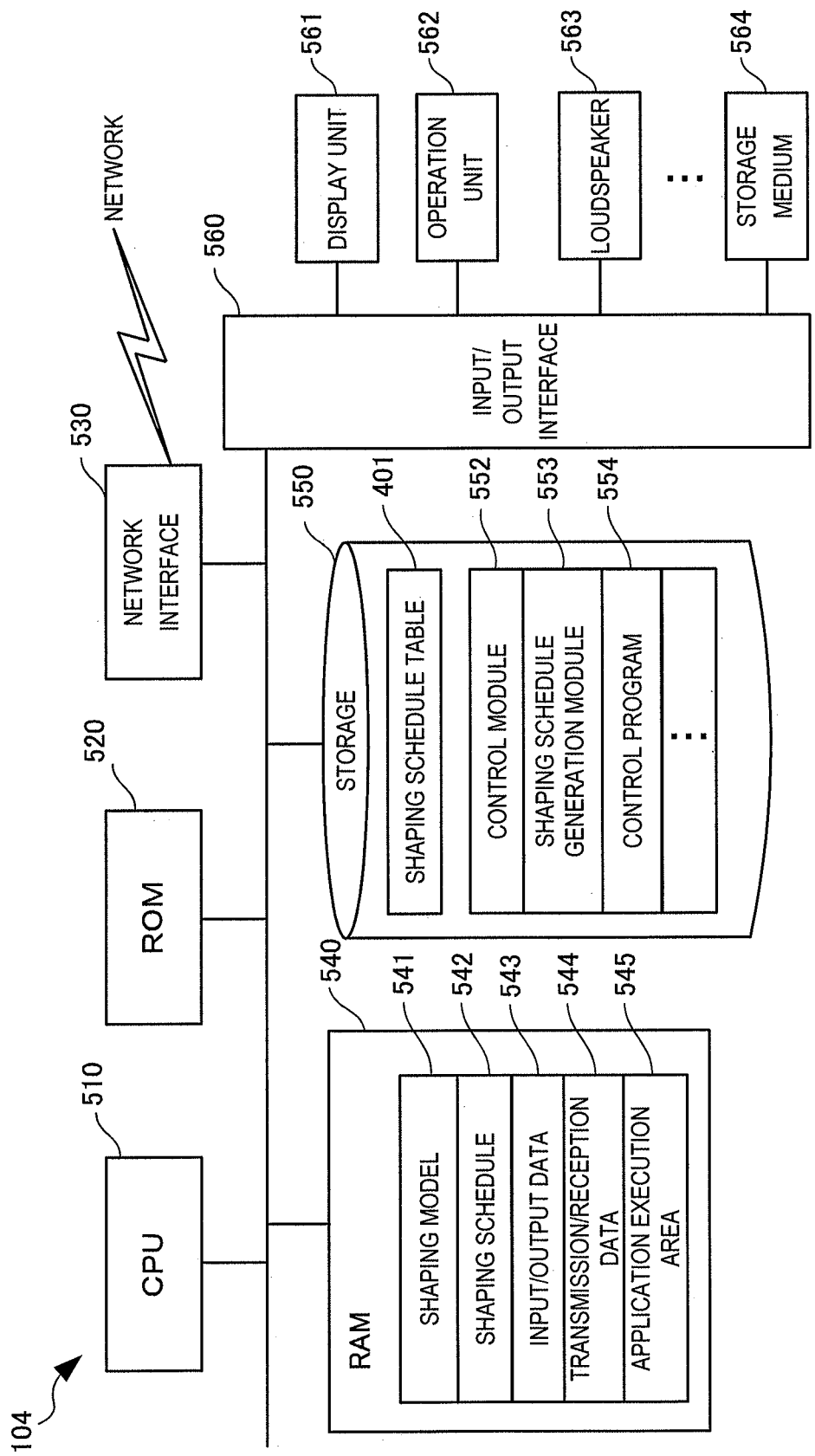
FIG. 5 is a block diagram showing the hardware arrangement of the controller of the three-dimensional laminating and shaping apparatus according to the first example embodiment of the present invention.

FIG. 5 is a block diagram showing the hardware arrangement of the controller 104 of the three-dimensional laminating and shaping apparatus 100 according to this example embodiment. A CPU (Central Processing Unit) 510 is an arithmetic control processor, and implements the functional components of the controller 104 of the three-dimensional laminating and shaping apparatus 100 shown in FIGS. 1A to 2B by executing a program. A ROM (Read Only Memory) 520 stores permanent data such as initial data and a program, and other programs. A network interface 530 communicates with another apparatus via a network. Note that the number of CPUs 510 is not limited to one, and a plurality of CPUs or a GPU (Graphics Processing Unit) for image processing may be included. The network interface 530 desirably includes a CPU independent of the CPU 510, and writes or reads out transmission/reception data in or from the area of a RAM (Random Access Memory) 540. It is desirable to provide a DMAC (Direct Memory Access Controller) for transferring data between the RAM 540 and a storage 550 (not shown). Furthermore, an input/output interface 560 desirably includes a CPU independent of the CPU 510, and writes or reads out input/output data in or from the area of the RAM 540. Therefore, the CPU 510 processes the data by recognizing that the data has been received by or transferred to the RAM 540. Furthermore, the CPU 510 prepares a processing result in the RAM 540, and delegates succeeding transmission or transfer to the network interface 530, DMAC, or input/output interface 560.

The RAM 540 is a random access memory used as a temporary storage work area by the CPU 510. An area to store data necessary for implementation of example embodiment is allocated to the RAM 540. A shaping model 541 is data obtained by modeling a three-dimensional laminated and shaped object, which is output from a CAD (Computer Aided Design), a CAM (Computer Aided Manufacturing), or the like. The three-dimensional laminating and shaping apparatus 100 performs shaping based on the shaping model 541. A shaping schedule 542 is data concerning the shaping schedule of the three-dimensional laminated and shaped object generated based on the shaping model 541, and is, for example, data loaded from the shaping schedule table 401.

Input/output data 543 is data input/output via the input/output interface 560. Transmission/reception data 544 is data transmitted/received via the network interface 530. The RAM 540 includes an application execution area 545 for executing various application modules.

The storage 550 stores a database, various parameters, or the following data or programs necessary for implementation of example embodiment. The storage 550 stores the shaping schedule table 401. The shaping schedule table 401 is the table, shown in FIG. 4, for managing the relationship between the shaping chamber IDs 411 and the schedule 412. The storage 550 also stores a control module 552 and a shaping schedule generation module 553. These modules are executed by the CPU 510.

The control module 552 is a module for controlling the material suppliers 102a and 102b and the light beam irradiator 103. The shaping schedule generation module 553 is a module for generating the shaping schedule of three-dimensional laminated and shaped objects. These modules 552 and 553 are read out by the CPU 510 into the application execution area 545 of the RAM 540, and executed. A control program 554 is a program for controlling the whole three-dimensional laminating and shaping apparatus 100.

The input/output interface 560 interfaces input/output data with an input/output device. The input/output interface 560 is connected to a display unit 561 and an operation unit 562. In addition, a storage medium 564 may be connected to the input/output interface 560. A loudspeaker 563 serving as a voice output unit and a microphone serving as a voice input unit may also be connected. Note that programs and data which are associated with the general-purpose functions of the controller 104 of the three-dimensional laminating and shaping apparatus 100 and other feasible functions are not shown in the RAM 540 or the storage 550 of FIG. 5.

Figure 6:
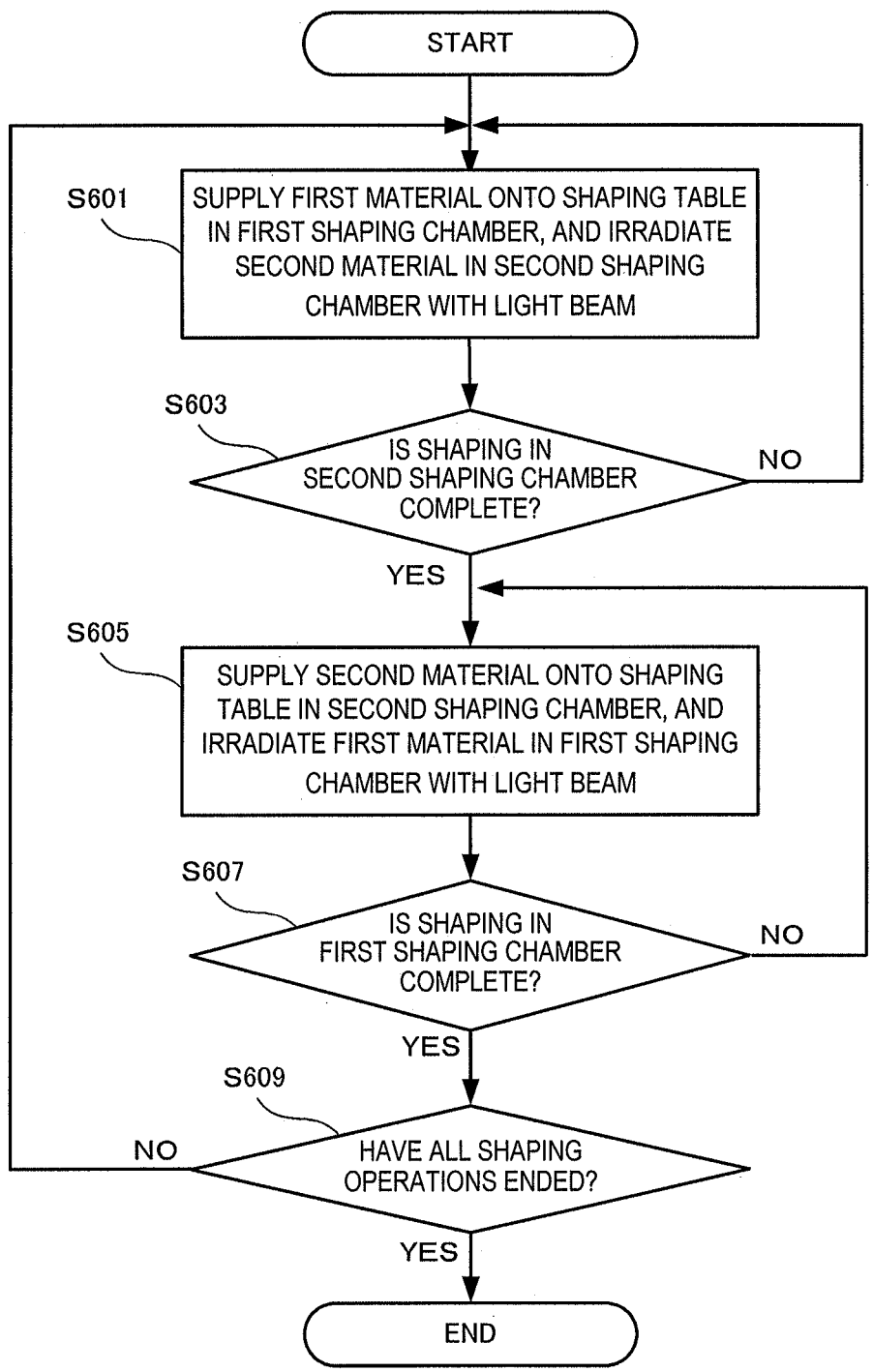
FIG. 6 is a flowchart for explaining the processing procedure of the three-dimensional laminating and shaping apparatus according to the first example embodiment of the present invention.

FIG. 6 is a flowchart for explaining the processing procedure of the three-dimensional laminating and shaping apparatus 100 according to this example embodiment. This flowchart is executed by the CPU 510 of FIG. 5 using the RAM 540, thereby implementing the functional components of the three-dimensional laminating and shaping apparatus 100 shown in FIGS. 1A to 2B.

In step S601, the three-dimensional laminating and shaping apparatus 100 supplies the first material onto the shaping table 111a in the shaping chamber 101a (first shaping chamber), and irradiates the second material in the shaping chamber 101b (second shaping chamber) with the light beam 131. In step S603, the three-dimensional laminating and shaping apparatus 100 determines whether shaping of a three-dimensional laminated and shaped object in the shaping chamber 101b is complete. If it is determined that shaping is not complete (NO in step S603), the three-dimensional laminating and shaping apparatus 100 returns to step S601 to repeat the subsequent steps; otherwise (YES in step S603), the three-dimensional laminating and shaping apparatus 100 advances to step S605.

In step S605, the three-dimensional laminating and shaping apparatus 100 supplies the second material onto the shaping table 111b of the shaping chamber 101b, and irradiates the first material in the shaping chamber 101a with the light beam 131. In step S607, the three-dimensional laminating and shaping apparatus 100 determines whether shaping of a three-dimensional laminated and shaped object is complete in the shaping chamber 101a. If it is determined that shaping is not complete (NO in step S607), the three-dimensional laminating and shaping apparatus 100 returns to step S605 to repeat the subsequent steps; otherwise (YES in step S607), the process advances to step S609. In step S609, the three-dimensional laminating and shaping apparatus 100 determines whether all shaping operations have ended. If it is determined that not all the shaping operations have ended (NO in step S609), the process returns to step S601 to repeat the subsequent steps; otherwise (YES in step S609), the three-dimensional laminating and shaping apparatus 100 ends the process.

Note that the example in which after shaping of the three-dimensional laminated and shaped object is completed in one shaping chamber 101a, shaping of the three-dimensional laminated and shaped object starts in the other shaping chamber 101b has been described above. However, for example, every time shaping of one or a few layers is completed, the light beam irradiator 103 may be moved to change the shaping chamber where irradiation of the light beam 131 is performed.

According to this example embodiment, it is possible to shorten the stop time (down time) of the whole apparatus caused by maintenance, replacement of the material, or the like. In addition, since irradiation of a light beam and planning and the like are alternately performed in the two shaping chambers, the down time can be shortened. That is, since the plurality of shaping chambers are connected to allow the shared use of the light beam irradiator, the down time can be shortened. Therefore, it is possible to efficiently operate the light beam irradiator as an expensive member without wastefully using it. Furthermore, since the down time can be shortened, the shaping time of the three-dimensional laminated and shaped object can also be shortened. It is possible to shape a three-dimensional shaped object of a different material by changing the material to be supplied to each shaping chamber. It is also possible to shape a larger three-dimensional laminated and shaped object by increasing the number of shaping chambers.

Second Example Embodiment

Figure 7A:
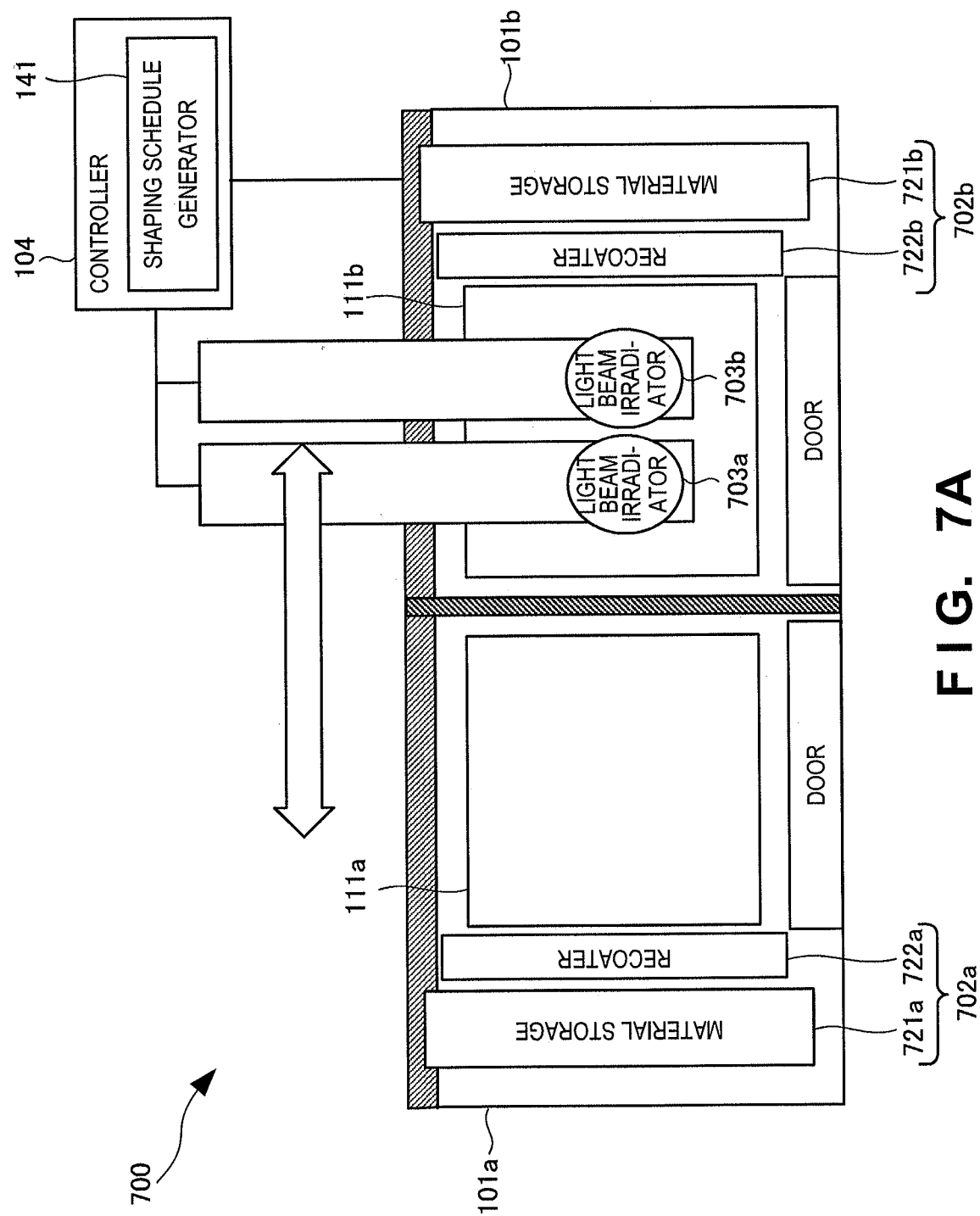
FIG. 7A is a plan view for schematically explaining the arrangement and operation of a three-dimensional laminating and shaping apparatus according to the second example embodiment of the present invention.
Figure 7B:
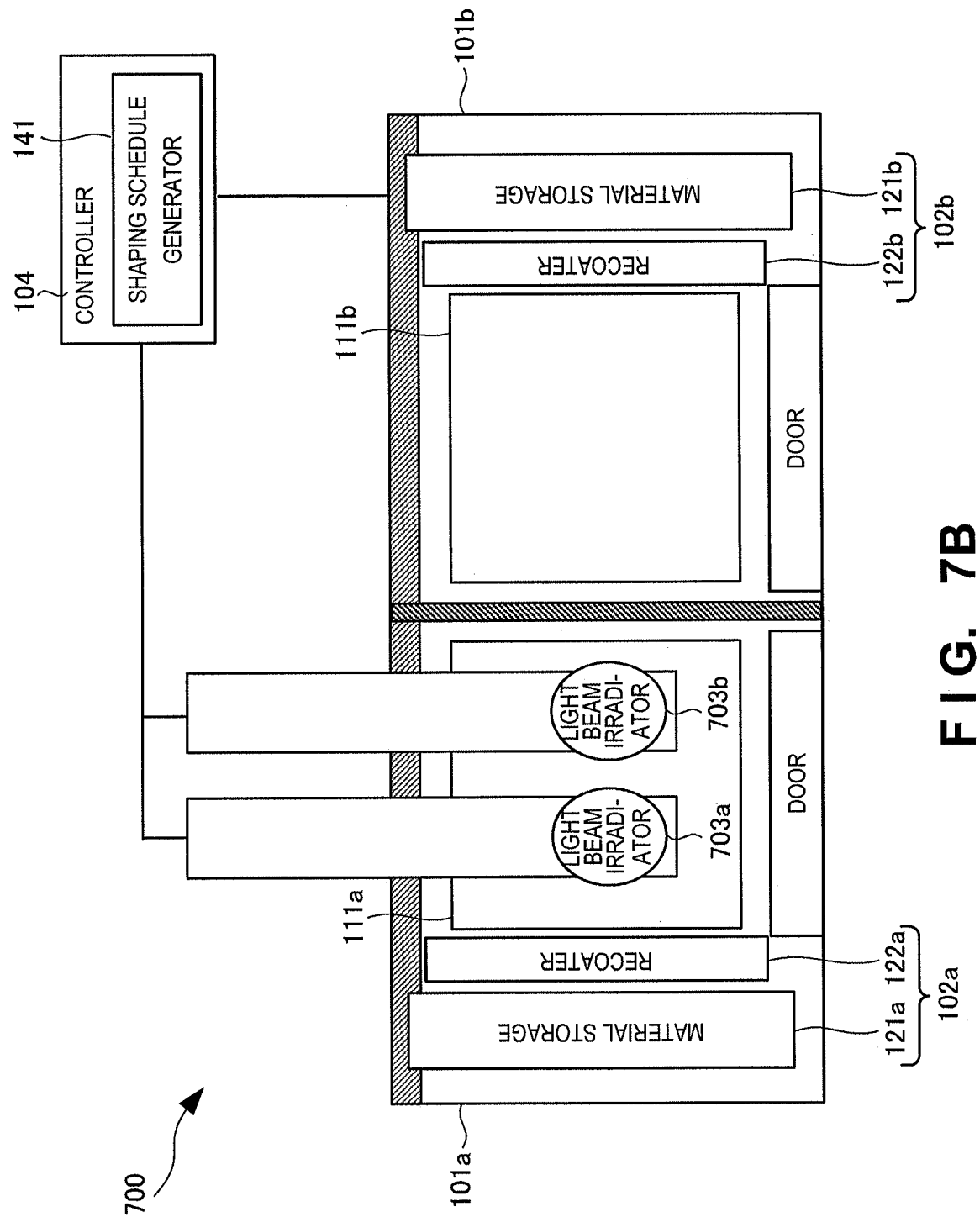
FIG. 7B is a plan view for schematically explaining the arrangement and operation of the three-dimensional laminating and shaping apparatus according to the second example embodiment of the present invention.
Figure 8A:
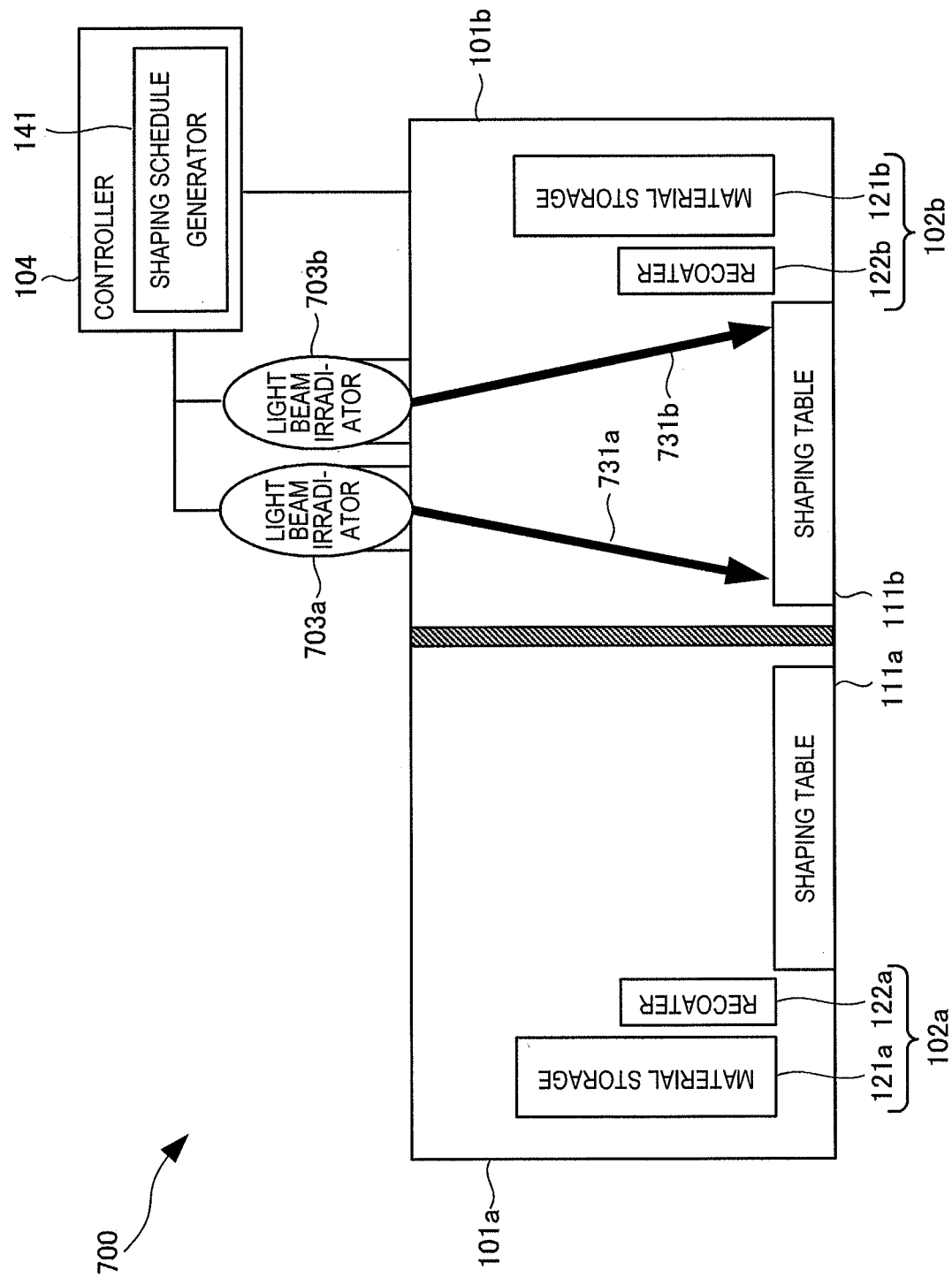
FIG. 8A is a front view for schematically explaining the arrangement and operation of the three-dimensional laminating and shaping apparatus according to the second example embodiment of the present invention.
Figure 8B:
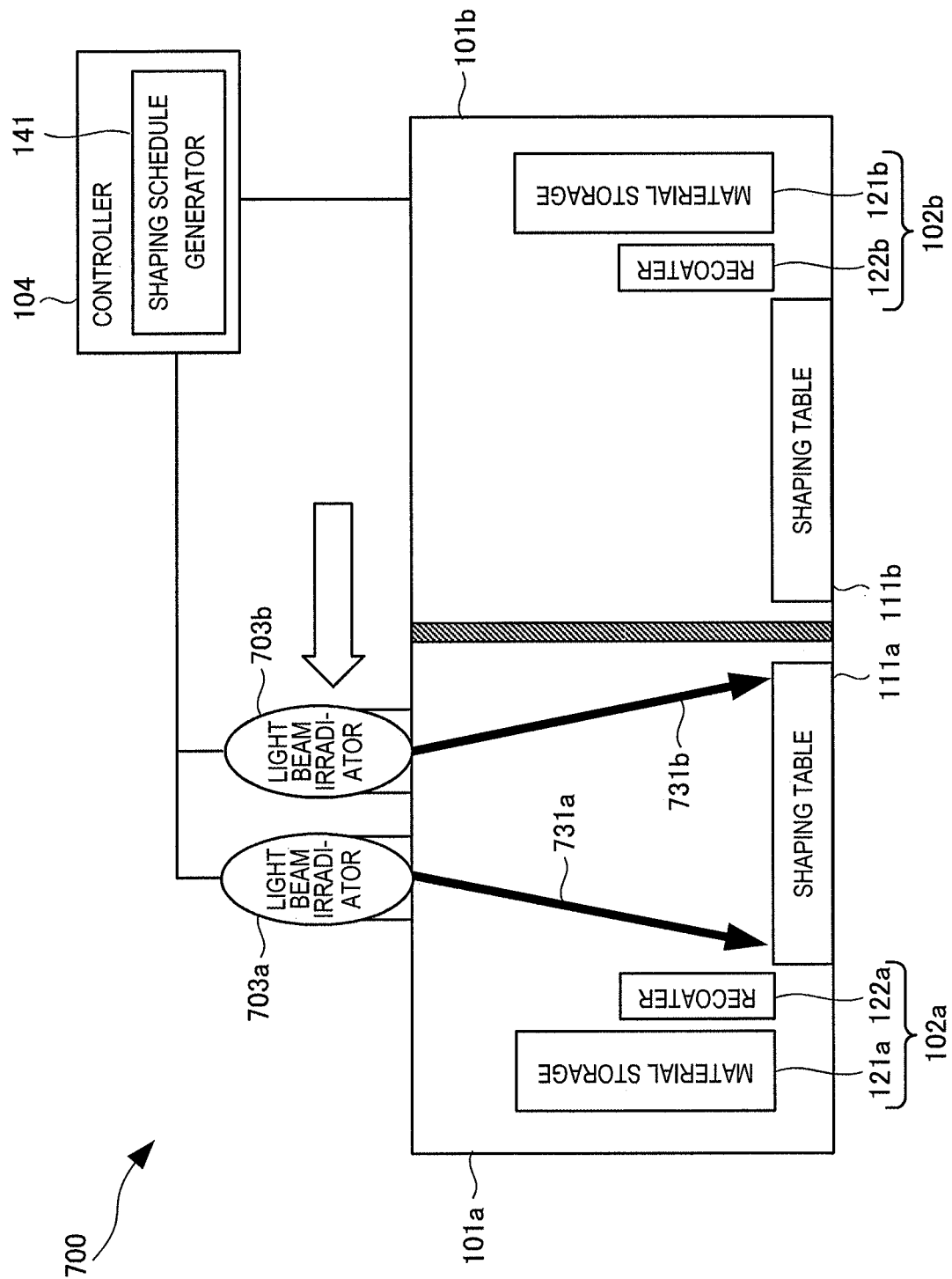
FIG. 8B is a front view for schematically explaining the arrangement and operation of the three-dimensional laminating and shaping apparatus according to the second example embodiment of the present invention.

A three-dimensional laminating and shaping apparatus according to the second example embodiment of the present invention will be described with reference to FIGS. 7A to 8B. FIGS. 7A and 7B are plan views for schematically explaining the arrangement and operation of a three-dimensional laminating and shaping apparatus 700 according to this example embodiment. FIGS. 8A and 8B are front views for schematically explaining the arrangement and operation of the three-dimensional laminating and shaping apparatus according to this example embodiment.

The three-dimensional laminating and shaping apparatus 700 according to this example embodiment is different from the first example embodiment in that two light beam irradiators are included. The remaining components and operations are the same as those in the first example embodiment. Hence, the same reference numerals denote the same components and operations, and a detailed description thereof will be omitted.

The three-dimensional laminating and shaping apparatus 700 includes light beam irradiators 703a and 703b. The three-dimensional laminating and shaping apparatus 700 irradiates a material with light beams 731a and 731b using the light beam irradiators 703a and 703b. In this way, in one shaping chamber 101a or 101b, the material may be irradiated with the light beams 731a and 731b using the two light beam irradiators 703a and 703b. However, the method of performing irradiation of the light beams 731a and 731b is not limited to this. For example, the light beam irradiator 703a may perform irradiation of the light beam 731a in the shaping chamber 101a, and the light beam irradiator 703b may perform irradiation of the light beam 731b in the shaping chamber 101b.

Note that the above description assumes that the number of light beam irradiators 703a and 703b is two. However, the number of light beam irradiators 703a and 703b is not limited to this, and may be three or more. Any combination of the number of shaping chambers 101a and 101b and the number of light beam irradiators 703a and 703b may be used.

According to this example embodiment, it is possible to shorten the stop time (down time) of the whole apparatus caused by maintenance, replacement of the material, or the like. Furthermore, since the number of light beam irradiators is two, the two light beam irradiators are used at the same time to melt the material, thereby halving the shaping (sintering) time. If the number of light beam irradiators is N (N≥3), the shaping time can be shortened to 1/N.

Third Example Embodiment

Figure 9:
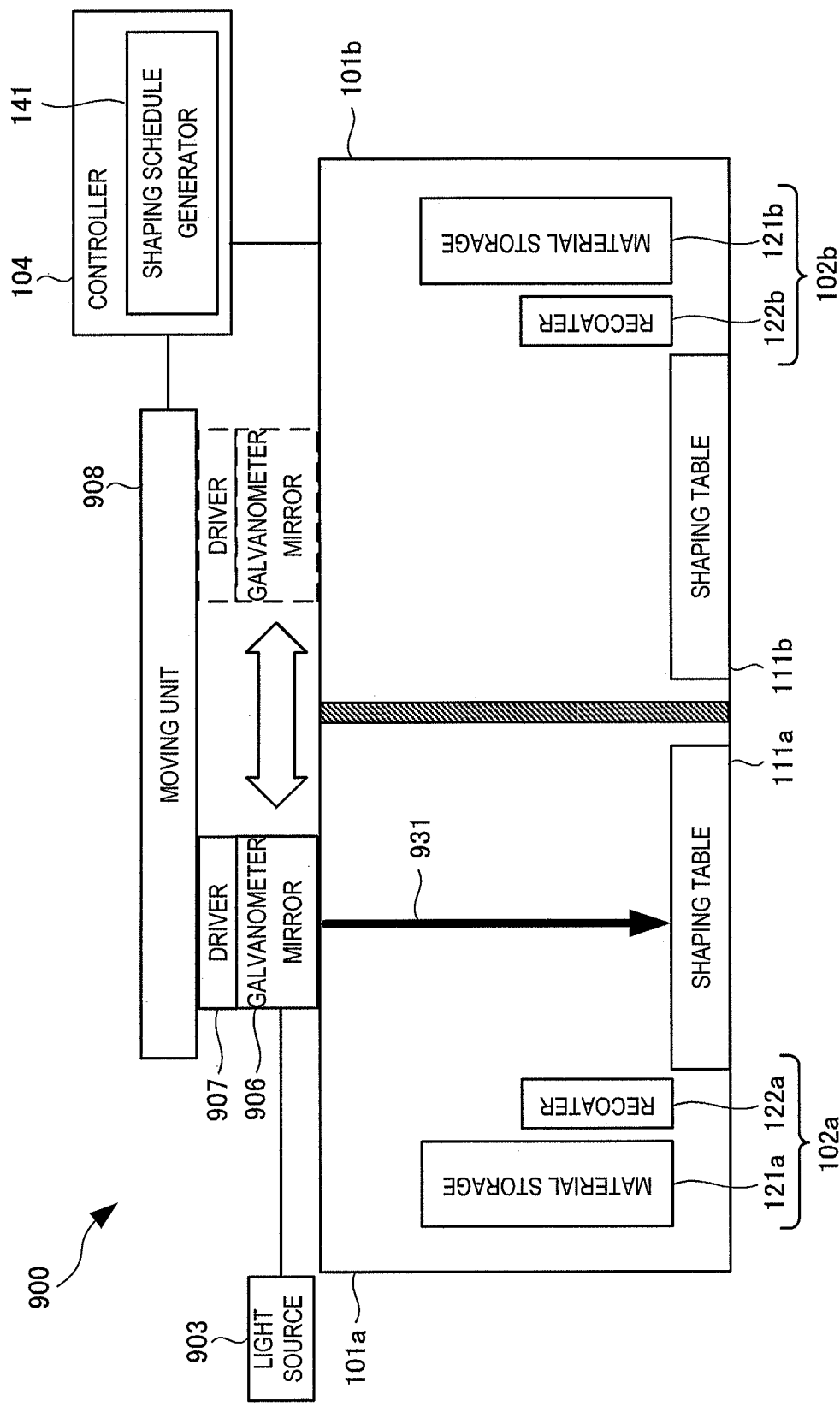
FIG. 9 is a plan view for schematically explaining the arrangement and operation of a three-dimensional laminating and shaping apparatus according to the third example embodiment of the present invention.

A three-dimensional laminating and shaping apparatus according to the third example embodiment of the present invention will be described with reference to FIG. 9. FIG. 9 is a front view for schematically explaining the arrangement and operation of a three-dimensional laminating and shaping apparatus 900 according to this example embodiment. The three-dimensional laminating and shaping apparatus 900 according to this example embodiment is different from the first and second example embodiments in that a light source, a galvanometer mirror, a driver, and a moving unit are included. The remaining components and operations are the same as those in the first and second example embodiments. Hence, the same reference numerals denote the same components and operations, and a detailed description thereof will be omitted.

Instead of the light beam irradiator 103, the three-dimensional laminating and shaping apparatus 900 includes a light source 903, a galvanometer mirror 906, a driver 907, and a moving unit 908. The light source 903 generates a light beam 931 such as a laser beam. A material on a shaping table 111a or 111b is irradiated, via the galvanometer mirror, with the light beam 931 generated by the light source 903. The driver 907 controls the movement of the galvanometer mirror 906 to change the direction in which the galvanometer mirror 906 faces, thereby adjusting the path of the light beam 931 generated by the light source 903. The moving unit 908 moves the galvanometer mirror 906 between shaping chambers 101a and 101b. The moving unit 908 is, for example, a slide rail or linear rail, but is not limited to them.

The above description has exemplified a case in which one galvanometer mirror 906 is included. However, two galvanometer mirrors 906 may be provided. In this case, as the operation mode of the galvanometer mirrors 906, for example, irradiation of the light beam 931 may be performed using the two galvanometer mirrors 906 in the shaping chamber 101a. Alternatively, irradiation of the light beam 931 may be performed using one of galvanometer mirrors 906 in each of the shaping chambers 101a and 101b. The number of galvanometer mirrors 906 may be three or more. As described above, as the number of galvanometer mirrors 906 increases, the irradiation time of the light beam 931 can be shortened, thereby shortening the shaping time of the three-dimensional laminated and shaped object.

According to this example embodiment, it is possible to shorten the stop time (down time) of the whole apparatus caused by maintenance, replacement of the material, or the like. Since the galvanometer mirror is used, it is possible to control the irradiation direction of the light beam at high speed, and also move the galvanometer mirror at high speed. Furthermore, the shaping time can be shortened by increasing the number of galvanometer mirrors.

Fourth Example Embodiment

A three-dimensional laminating and shaping apparatus according to the fourth example embodiment of the present invention will be described with reference to FIGS. 10A to 10C. The three-dimensional laminating and shaping apparatus according to this example embodiment corresponds to an example embodiment in which the number of shaping chambers and the number of light beam irradiators are changed in the three-dimensional laminating and shaping apparatus described in each of the first to third example embodiments.

The operation of the three-dimensional laminating and shaping apparatus according to this example embodiment will be described with reference to FIGS. 10A to 10C. FIGS. 10A to 10C are tables for explaining examples of shaping schedule tables 1101, 1102, and 1103 each included in the three-dimensional laminating and shaping apparatus according to this example embodiment. FIG. 10A shows an example in which one light beam irradiator 103 and three shaping chambers are included. FIG. 10B shows an example in which two light beam irradiators 103 and three shaping chambers are included. FIG. 10C shows an example in which two light beam irradiators 103 and four shaping chambers are included. "○" indicates a light beam irradiation process (sintering process) of melting and solidifying a material by performing irradiation of a light beam 131, and "-" indicates a process of performing no irradiation of the light beam 131 (a process of performing planning, extraction of a three-dimensional laminated and shaped object, or the like). Each of the shaping schedule tables 1101, 1102, and 1103 stores a schedule 1112, 1122, or 1132 in association with shaping chamber IDs 1111, 1121, and 1131.

As shown in FIG. 10A, the schedule indicates that during a time interval T1, irradiation of the light beam is performed in a shaping chamber having a shaping chamber ID "P001" and planning and the like are made in shaping chambers having shaping chamber IDs "P002" and "P003". The schedule indicates that during a time interval T2, irradiation of the light beam is performed in the shaping chamber having the shaping chamber ID "P002" and planning and the like are made in the shaping chambers having the shaping chamber IDs "P001" and "P003". The schedule indicates that during a time interval T3, irradiation of the light beam is performed in the shaping chamber having the shaping chamber ID "P003" and planning and the like are made in the shaping chambers having the shaping chamber IDs "P001" and "P002". During a time interval T4 and subsequent time intervals, the above-described schedule may be repeatedly executed or a changed schedule may be executed.

As shown in FIG. 10B, the schedule indicates that during a time interval T1, irradiation of the light beam is performed in shaping chambers having shaping chamber IDs "P001" and "P002" and planning and the like are made in a shaping chamber having a shaping chamber ID "P003". The schedule indicates that during a time interval T2, irradiation of the light beam is performed in the shaping chambers having the shaping chamber IDs "P002" and "P003" and planning and the like are made in the shaping chamber having the shaping chamber ID "P001". The schedule indicates that during a time interval T3, irradiation of the light beam is performed in the shaping chambers having the shaping chamber IDs "P001" and "P003" and planning and the like are made in the shaping chamber having the shaping chamber ID "P002". After the time interval T3, the above-described schedule may be repeatedly executed or a changed schedule may be executed.

Figure 10C:
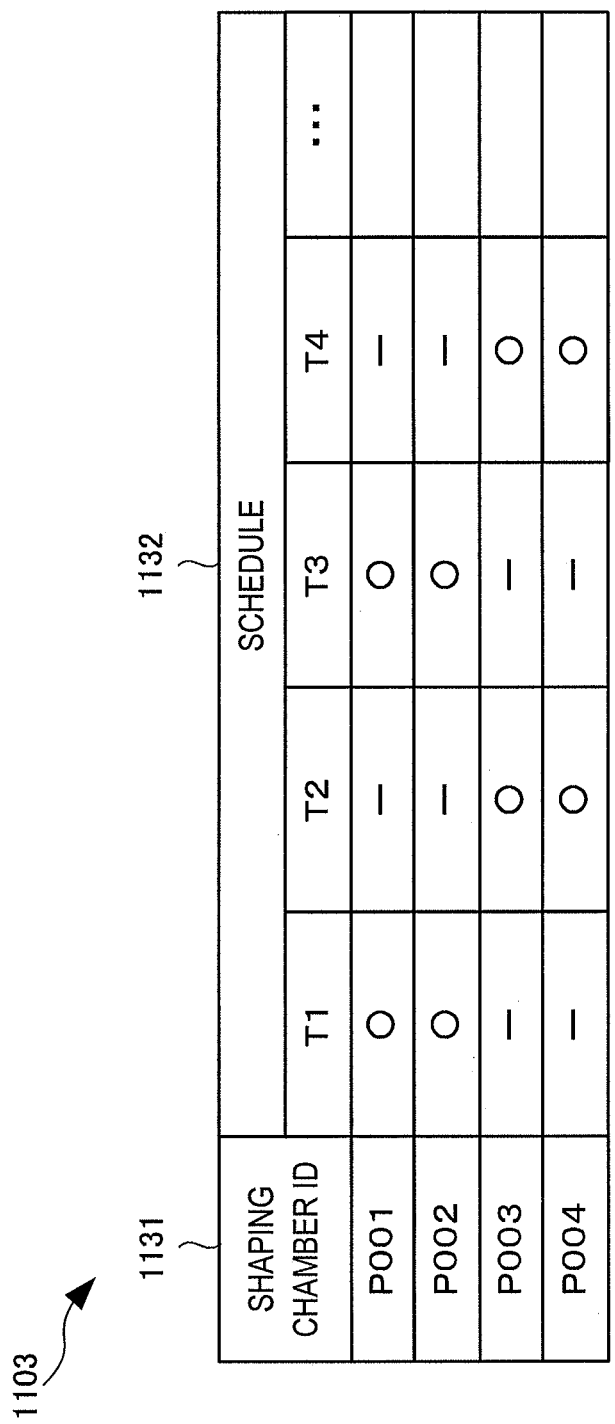
FIG. 10C is a table for explaining still other example of the shaping schedule table included in the three-dimensional laminating and shaping apparatus according to the fourth example embodiment of the present invention.

As shown in FIG. 10C, the schedule indicates that during a time interval T1, irradiation of the light beam is performed in shaping chambers having shaping chamber IDs "P001" and "P002" and planning and the like are made in shaping chambers having shaping chamber IDs "P003" and "P004". The schedule indicates that during a time interval T2, irradiation of the light beam is performed in the shaping chambers having the shaping chamber IDs "P003" and "P004" and planning and the like are made in the shaping chambers having the shaping chamber IDs "P001" and "P002". During a time interval T3 and subsequent time intervals, the above-described schedule may be repeatedly executed or a changed schedule may be executed. Note that even if any numbers of light beam irradiators and shaping chambers are provided, a shaping schedule table can be created in the same manner.

According to this example embodiment, even if any numbers of light beam irradiators and shaping chambers are provided, the method described in each of the first to third example embodiments is applicable. Thus, it is possible to shorten the stop time (down time) of the whole apparatus caused by maintenance, replacement of the material, or the like.

Other Example Embodiments

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A three-dimensional laminating and shaping apparatus comprising:
a plurality of shaping chambers having shaping tables, respectively;
a plurality of material suppliers that supply materials of three-dimensional laminated and shaped objects onto said shaping tables in said plurality of shaping chambers, respectively;
a plurality of light beam irradiators that emit light beams that irradiate the materials on said shaping tables; and
a controller that includes a moving unit that moves all of said plurality of light beam irradiators between said plurality of shaping chambers and controls said plurality of material suppliers and said plurality of light beam irradiators,
wherein at a timing when shaping of a first of the three-dimensional laminated and shaped objects is completed on a first of said shaping tables in a first of said plurality of shaping chambers using a first of said plurality of material suppliers, said controller (1) stops use of the first of said plurality of shaping chambers during a first stopped period so that a user can, during the stopped period, extract the completed first three-dimensional laminated and shaped object, and plan for shaping a third three-dimensional laminated and shaped object in said first of said plurality of shaping chamber, (2) moves said plurality of light beam irradiators onto a second of said plurality of shaping tables in a second of said plurality of shaping chambers, and (3) starts shaping of a second of the three-dimensional laminated and shaped objects in said second of said plurality of shaping chambers using a second of said plurality of material suppliers, and
at a timing when shaping of the second of the three-dimensional laminated and shaped objects is completed on the second of said shaping tables in the second of said plurality of shaping chambers using the second of said plurality of material suppliers, said controller (4) stops use of the second of said plurality of shaping chambers during a second stopped period so that the user can, during another stopped period, extract the completed second three-dimensional laminated and shaped object and plan for shaping a fourth three-dimensional laminated and shaped object in the second of said plurality of shaping chambers, (5) moves said plurality of light beam irradiators onto the first of said plurality of shaping tables in the first of said plurality of shaping chambers, and (6) starts shaping of the third three-dimensional laminated and shaped object in the first of said plurality of shaping chambers using the first of said plurality of material suppliers.

2. The three-dimensional laminating and shaping apparatus according to claim 1, further comprising
galvanometer mirrors, and
drivers that drive said galvanometer mirrors to guide the light beam onto each of the shaping tables.

3. The three-dimensional laminating and shaping apparatus according to claim 1, wherein said moving unit comprises one of a slide rail and a linear rail.

4. The three-dimensional laminating and shaping apparatus according to claim 1, wherein said controller further includes a shaping schedule generator that generates and stores a shaping schedule of shaping the three-dimensional laminated and shaped objects in said plurality of shaping chambers, and controls said material suppliers and said plurality of light beam irradiators based on the shaping schedule.

5. The three-dimensional laminating and shaping apparatus according to claim 1, wherein the plan for shaping the third three-dimensional laminated and shaped object in said first of said plurality of shaping chambers includes planning for refilling a material storage for the first of said plurality of shaping chambers with a material, cleaning an interior of the first of the plurality of shaping chambers, and performing maintenance on the first of the plurality of shaping chambers, and
the plan for shaping the fourth three-dimensional laminated and shaped object in the second of said plurality of shaping chambers includes planning for refilling a material storage for the second of said plurality of shaping chambers with the material, cleaning an interior of the second of the plurality of shaping chambers, and performing maintenance on the second of the plurality of shaping chambers.

6. A control method of a three-dimensional laminating and shaping apparatus comprising the steps of:
(a) providing the three-dimensional laminating and shaping apparatus according to claim 1,
(b) causing the first material supplier to supply a first material onto the first shaping table in the first shaping chamber, and causing the plurality of light beam irradiators to irradiate a second material in the second shaping chamber with the light beams;
(c) causing the second material supplier to supply a second material onto the second shaping table in the second shaping chamber, and causing the plurality of light beam irradiators to irradiate the first material in the first shaping chamber with the light beam; and
(d) repeating the steps (b) and (c) while moving the plurality of light beam irradiators between the first and second shaping chambers.

7. A non-transitory computer readable medium storing a control program for the three-dimensional laminating and shaping apparatus according to claim 1, wherein the program is configured for causing a computer to execute a method comprising the steps of:
(a) causing the first material supplier to supply a first material onto the first shaping table in the first shaping chamber, and causing the plurality of light beam irradiators to irradiate a second material in the second shaping chamber with the light beams;
(b) causing the second material supplier to supply a second material onto the second shaping table in the second shaping chamber, and causing the plurality of light beam irradiators to irradiate the first material in the first shaping chamber with the light beams; and
(c) repeating the steps (a) and (b) while moving the plurality of light beam irradiators between the first and second shaping chambers.

\* \* \* \* \*